US012240113B2

(12) United States Patent
Levine et al.

(10) Patent No.: US 12,240,113 B2
(45) Date of Patent: *Mar. 4, 2025

(54) DEEP REINFORCEMENT LEARNING FOR ROBOTIC MANIPULATION

(71) Applicant: GOOGLE LLC, Mountain View, CA (US)

(72) Inventors: Sergey Levine, Berkeley, CA (US);
Ethan Holly, San Francisco, CA (US);
Shixiang Gu, Mountain View, CA (US); Timothy Lillicrap, London (GB)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/526,443

(22) Filed: Dec. 1, 2023

(65) Prior Publication Data

US 2024/0131695 A1 Apr. 25, 2024

Related U.S. Application Data

(63) Continuation of application No. 17/878,186, filed on Aug. 1, 2022, now Pat. No. 11,897,133, which is a (Continued)

(51) Int. Cl.
G06F 17/00 (2019.01)
B25J 9/16 (2006.01)
(Continued)

(52) U.S. Cl.
CPC ............. B25J 9/161 (2013.01); B25J 9/163 (2013.01); B25J 9/1664 (2013.01);
(Continued)

(58) Field of Classification Search
CPC .......... B25J 9/161; B25J 9/163; B25J 9/1664; G05B 13/027; G05B 19/042;
(Continued)

(56) References Cited

U.S. PATENT DOCUMENTS 8,060,251 B2  11/2011  Gonzalez-Banos et al.
9,056,396 B1   6/2015  Linnell
(Continued)

FOREIGN PATENT DOCUMENTS

CN  102402712  4/2012
CN  104956359  9/2015
(Continued)

OTHER PUBLICATIONS

Stabilizing off-policy Q-Learning (Year: 2019).*
(Continued)

Primary Examiner — Ronnie M Mancho
(74) Attorney, Agent, or Firm — Gray Ice Higdon

(57) ABSTRACT

Implementations utilize deep reinforcement learning to train a policy neural network that parameterizes a policy for determining a robotic action based on a current state. Some of those implementations collect experience data from multiple robots that operate simultaneously. Each robot generates instances of experience data during iterative performance of episodes that are each explorations of performing a task, and that are each guided based on the policy network and the current policy parameters for the policy network during the episode. The collected experience data is generated during the episodes and is used to train the policy network by iteratively updating policy parameters of the policy network based on a batch of collected experience data. Further, prior to performance of each of a plurality of episodes performed by the robots, the current updated policy parameters can be provided (or retrieved) for utilization in performance of the episode.

21 Claims, 7 Drawing Sheets

Related U.S. Application Data continuation of application No. 16/333,482, filed as application No. PCT/US2017/051646 on Sep. 14, 2017, now Pat. No. 11,400,587.

(60) Provisional application No. 62/395,340, filed on Sep. 15, 2016.

(51) Int. Cl.
| | | |
|---|---|---|
| *G05B 13/02* | (2006.01) | |
| *G05B 19/042* | (2006.01) | |
| *G06N 3/008* | (2023.01) | |
| *G06N 3/045* | (2023.01) | |
| *G06N 3/08* | (2023.01) | |

(52) U.S. Cl.
CPC ......... *G05B 13/027* (2013.01); *G05B 19/042* (2013.01); *G06N 3/008* (2013.01); *G06N 3/045* (2023.01); *G06N 3/08* (2013.01); *G05B 2219/32335* (2013.01); *G05B 2219/33033* (2013.01); *G05B 2219/33034* (2013.01); *G05B 2219/39001* (2013.01); *G05B 2219/39298* (2013.01); *G05B 2219/40499* (2013.01)

(58) Field of Classification Search
CPC ........... G05B 2219/32335; G05B 2219/33033; G05B 2219/33034; G05B 2219/39001; G05B 2219/39298; G05B 2219/40499; G05B 13/042; G06N 3/008; G06N 3/045; G06N 3/08; G06N 3/084
USPC ......................................... 700/253
See application file for complete search history.

(56) References Cited

U.S. PATENT DOCUMENTS

| | | | | |
|---|---|---|---|---|
| 9,104,197 | B2 * | 8/2015 | Miegel | G05B 19/425 |
| 9,186,795 | B1 | 11/2015 | Edsinger et al. | |
| 9,302,393 | B1 * | 4/2016 | Rosen | G06N 3/008 |
| 9,346,164 | B1 | 5/2016 | Edsinger | |
| 9,676,098 | B2 | 6/2017 | Hemken | |
| 9,776,325 | B1 | 10/2017 | Hoffmann | |
| 9,855,658 | B2 * | 1/2018 | Babu | B25J 9/1694 |
| 9,981,381 | B1 | 5/2018 | Nagarajan | |
| 10,922,957 | B2 | 2/2021 | Rhoads et al. | |
| 11,159,909 | B2 | 10/2021 | Anderson | |
| 11,400,587 | B2 * | 8/2022 | Levine | B25J 9/1664 |
| 11,554,482 | B2 | 1/2023 | Chen | |
| 11,584,012 | B2 | 2/2023 | Morra | |
| 2012/0190386 | A1 | 7/2012 | Anderson | |
| 2015/0100530 | A1 | 4/2015 | Mnih et al. | |
| 2016/0075018 | A1 | 3/2016 | Izhikevich | |
| 2016/0082597 | A1 | 3/2016 | Gorshechnikov | |
| 2016/0232445 | A1 | 8/2016 | Srinivasan et al. | |
| 2019/0232488 | A1 | 8/2019 | Levine et al. | |
| 2022/0388159 | A1 * | 12/2022 | Levine | G06N 3/045 |

FOREIGN PATENT DOCUMENTS

| | | |
|---|---|---|
| CN | 105637540 | 6/2016 |
| JP | 2005238422 | 9/2005 |
| JP | 2011204036 | 10/2011 |
| WO | 2006122030 | 11/2006 |
| WO | 2015054264 | 4/2015 |
| WO | 2016127045 | 8/2016 |
| WO | 2018053187 | 3/2018 |

OTHER PUBLICATIONS

Kumar et al.; Stabilizing Off-Policy Q-Learning via Bootstrapping Error Reduction; 11 pages; dated 2019.
Gu, Shixiang et al.; Continuous Deep Q-Learning with Model-based Acceleration; 10 pages; dated 2012.
Gu, Shixiang et al.; Deep Reinforcement Learning for Robotic Manipulation with Asynchronous Off-Policy Updates; 9 pages; dated 2017.
Lu, Yao et al.; AW-Opt: Learning Robotic Skills with Imitation and Reinforcement at Scale; 11 pages; dated 2021.
Nair, A. et al., "Massively Parallel Methods for Deep Reinforcement Learning." Deep Learning Workshop, International Conference on Machine Learning, Lille, France; Jul. 16, 2015; 14 pages.
Chavez, K. et al., "Distributed Deep Q-Learning." arXiv: 1508. 04186. arxiv.org, 8 pages Oct. 15, 2015.
European Patent Office; International Search Report and Written Opinion of PCT Ser. No. PCT/US2017/051646; 21 pages; dated Feb. 13, 2018.
European Patent Office; International Preliminary Report on Patentability of PCT Ser. No. PCT/US2017/051646; 17 pages; dated Mar. 28, 2019.
Japanese Patent Office; Notice of Allowance issue in Application No. 2019-514301; 3 pages; dated May 25, 2020.
Korean Patent Office; Office Action issue in Korean Application No. 1020197009013; 8 pages; dated Jul. 24, 2020.
Korean Patent Office: Notice of Allowance issued for Application No. 10-2019-7009013 dated Oct. 29, 2020.
European Patent Office; Communication Pursuant to Article 94(3) EPC issued in Application No. 17772579.3; 13 pages; dated Oct. 7, 2021.
Chinese Patent Office: Office Action issued in Application No. 201780067067.9; 10 pages; dated Aug. 27, 2021.
China National Intellectual Property Administration; Notice of Grant issued for Application No. 201780067067.9 dated May 7, 2022, 5 pages. May 7, 2022.
Chinese Patent Office; Second Office Action issued in Application No. 201780067067.9, 11 pages, dated Mar. 7, 2022.
European Patent Office; Communication Pursuant to Article 94(3) EPC issued in Application No. 17772579.3; 13 pages; dated Nov. 9, 2023.

* cited by examiner

DEEP REINFORCEMENT LEARNING FOR ROBOTIC MANIPULATION

BACKGROUND

Many robots are programmed to utilize one or more end effectors to manipulate one or more objects. For example, a robot may utilize an end effector to apply force to an object and cause movement of that object. For instance, a robot may utilize a grasping end effector or other end effector to displace an object without necessarily grasping that object. Also, for instance, a robot may utilize a grasping end effector such as an "impactive" gripper or "ingressive" gripper (e.g., physically penetrating an object using pins, needles, etc.) to pick up an object from a first location, move the object to a second location, and drop off the object at the second location.

SUMMARY

Implementations described below provide for improvements in operational performance of one or more robots when carrying out one or more tasks. The performance of the one or more robots is improved using a reinforcement learning process, as described herein, which facilitates rapid learning of optimal approaches, or policies, for performing particular physical tasks using the one or more robots. The robots are able to use the learned policies to make efficiency gains in the performance of the tasks. Physical tasks may, for example, be performed by the robots more quickly and/or with less electrical power consumption as the described reinforcement learning process takes place. Such physical tasks may additionally, or alternatively, be performed more safely, or may continue to be carried out within defined safety parameters as other aspects of the robots' performance improves with the learning process.

As will be evident from the following disclosure, the learning process may be iterative. The one or more robots may perform in accordance with each new improved iteration of the policy/approach for a particular task as the new iterations are passed through to the computing apparatus(es) responsible for controlling the robots' physical actions. As such, the efficiency gains referred to above, in terms of the physical actions performed by the robots, may occur frequently as the learning process continues. Overall, the rate at which the performance of the robots improves, along with the resulting efficiency gains, may be particularly fast and may result in the robots carrying out physical tasks in an optimal manner in less time than with other learning techniques. It will be appreciated that this results in the above-mentioned advantages, such as improved power consumption at the robots, being experienced at an earlier stage. This is described below, for example as part of the explanation of a decoupling between training threads and experience threads for the one or more robots in different computer processors. In particular, it is explained that parallelizing a training algorithm across multiple robots which pool their policy updates asynchronously can result in a policy neural network that is more accurate and/or robust after a given number of training iterations.

The goal in reinforcement learning is to control an agent attempting to maximize a reward function which, in the context of a robotic skill (also referred to herein as a task), denotes a user-provided definition of what the robot should try to accomplish. At state $x_t$ in time t, the agent chooses and executes action $u_t$ according to its policy $\pi(u_t|x_t)$, transitions to a new state $x_t$ according to dynamics of the robot $p(x_t|x_t,u_t)$, and receives a reward $r(x_t,u_t)$. The goal of reinforcement learning is find the optimal policy $\pi^*$ which maximizes the expected sum of rewards from an initial state distribution. The reward is determined based on the reward function which, as mentioned above, is dependent on the robotic task to be accomplished. Accordingly, reinforcement learning in the robotics context seeks to learn an optimal policy for performance of a given robotic task.

Implementations disclosed herein utilize deep reinforcement learning to train a policy network that parameterizes a policy for determining a robotic action based on a current state. The current state can include the state of the robot (e.g., angles of joints of the robot, position(s) of end effector(s) of the robot, and/or their time derivatives) and/or the current state of one or more components in the robot's environment (e.g., a current state of sensor(s) in the robot's environment, current pose(s) of target object(s) in the robot's environment). The policy network can be a neural network, such as a deep neural network. For example, the policy network can be a neural network that accepts the current state as input and that generates, based on the input and learned policy parameters of the neural network, output that indicates an action to be implemented. For instance, the output can indicate velocity commands to be provided to each of the actuators of the robot, or torques to be applied to each of the actuators of the robot. A robot can utilize a policy neural network by applying a current state to the policy neural network at each control cycle of the robot, generating output by processing the current state using the policy neural network, and implementing control commands to effectuate the action indicated by the output. The state following implementation of the control commands can then be utilized as the current state at the next control cycle.

Implementations disclosed herein collect experience data from multiple robots that operate simultaneously. Each robot generates instances of experience data during iterative performance of episodes that are each explorations of performing a task, and that are each guided based on the policy network and the current policy parameters for the policy network during the episode. For example, during an episode a robot can generate an instance of experience data at each control cycle of a plurality of control cycles of the robot during the episode. Each instance of experience data can indicate a corresponding: current/beginning state, subsequent state transitioned to from the beginning state, robotic action executed to transition from the beginning state to the subsequent state (where the action is based on application of the beginning state to the policy network and its current policy parameters), and optionally a reward for the action (as determined based on the reward function). The collected experience data is generated during the episodes and is used to train the policy network by iteratively updating policy parameters of the policy network based on a batch of collected experience data. Further, prior to performance of each of a plurality of episodes performed by the robots, the current updated policy parameters can be provided (or retrieved) for utilization in performance of the episode. For example, each robot can, prior to the performance of each of its episodes, obtain the updated policy parameters from a most recent iteration of the training, and use the updated policy parameters in performance of the episode. Accordingly, the experience data of each episode is based on the policy network with updated policy parameters from a most recent (relative to the start of the episode) iteration of the training.

In many implementations, the training of the policy network is asynchronous relative to the generation and collection of the experience data from the multiple robots. That is, thread(s) that train/update the policy network are decoupled from the thread(s) that generate and/or collect the experience data from the multiple robots. For example, the training/updating threads can operate on one or more processors and the experience threads can operate on one or more additional processors that are separate from the one or more processors operating the training/updating threads. The decoupling between the training and the experience threads can ensure that a difference in training speed and experience collection speed does not halt control programs of the robots generating the experience data, which are often required to send controls at fixed frequencies. In other words, the decoupling can enable experience data collection to continue to occur through corresponding experience threads without halting of those threads for training purposes. Moreover, the decoupling enables the training threads to operate in parallel with the experience threads, asynchronously and iteratively update policy parameters for the policy network, and iteratively provide updated policy parameters for episodes. Also, in many implementations the training thread(s) can operate a frequency (e.g., 60 Hz) that is greater than one or more (e.g., all) of the control frequencies of the robots (e.g., 20 Hz). In those implementations, real-world (e.g., clock on the wall) training times can be reduced (relative to techniques that do not utilize experience data from multiple robots) by obtaining experience data from multiple robots operating in parallel and by performing the training asynchronously in separate thread(s). For example, the training can occur without any (or without less) delays that are due to not having new experience data available in a buffer. Also, for example, the separate threads can prevent the need to halt experience data collection to enable training to occur, or vice versa.

Moreover, the utilization of experience data from multiple robots and the decoupling of the training and experience collection threads can result in a model that is more accurate and/or robust after a given number of training iterations, than if such techniques were not utilized. This can be due, for example, to experience data that is generated by a robot in a given episode being based on policy parameters that are updated based on both: past instances of experience data from the robot, and past instances of experience data from other robot(s) operating in parallel. For example, in a third episode of a robot, the policy parameters utilized in the third episode can be based on not only experience data from the first and/or second episode of the robot, but also on experience data from a first and/or second episodes of robot(s) operating in parallel. In this manner, the experience data generated in the third episode is based on the policy network with updated policy parameters that are trained in view of experience data from more than just two prior episodes, which can cause experience data to be generated in the third episode that leads to faster convergence than if the update policy parameters were only trained in view of experience data from two prior episodes.

In various implementations described herein, one or more of the multiple robots generating experience data can operate asynchronously relative to one another and/or the updated policy parameters can be provided to (or retrieved) by the robots asynchronously prior to episode performance. In this manner, updated policy parameters provided to each of multiple robots can vary relative to one another. For example, at a first time a first robot can obtain updated policy parameters for use in an episode to be performed by the first robot. At the first time, the second robot can still be performing a prior episode. At a second time subsequent to the first time, the second robot can then obtain further updated policy parameters for use in an episode that is to be performed by the second robot and that is immediately subsequent to the prior episode. At the second time, the further updated policy parameters obtained can be different from the updated policy parameters obtained by the first robot at the first time (due to further training that occurred between the first and second times). In this manner, the updated policy parameters obtained by the first robot at the first time are not provided to the second robot for utilization. Rather, the more up to date further updated policy parameters are obtained.

In some implementations, a method is provided that includes performance of the following steps during performance of a plurality of episodes by each of a plurality of robots, where each of the episodes is an exploration of performing a task based on a policy neural network representing a reinforcement learning policy for the task: storing, in a buffer, instances of robot experience data generated during the episodes by the robots, where each of the instances of the robot experience data is generated during a corresponding one of the episodes, and is generated at least in part on corresponding output generated using the policy neural network with corresponding policy parameters for the policy neural network for the corresponding episode; iteratively generating updated policy parameters of the policy neural network, where each of the iterations of the iteratively generating includes generating the updated policy parameters using a group of one or more of the instances of the robot experience data in the buffer during the iteration; and by each of the robots in conjunction with a start of each of a plurality of the episodes performed by the robot, updating the policy neural network to be used by the robot in the episode, wherein updating the policy neural network includes using the updated policy parameters of a most recent iteration of the iteratively generating the updated policy parameters.

These and other implementations disclosed herein can include one or more of the following features.

Each of the updated policy parameters can define a corresponding value for a corresponding node of a corresponding layer of the policy neural network.

The instances of the robot experience data for a given robot of the robots can be stored in the buffer at a first frequency that is a lower frequency than a generating frequency of the iteratively generating the updated policy parameters.

The instances of the robot experience data for each of the robots can be stored in the buffer at corresponding frequencies that are each lower than a generating frequency of the iteratively generating the updated policy parameters.

Storing, in the buffer, the instances of the robot experience data can be performed by one more processors in a first thread and the iteratively generating can be performed by one or more of the processors in a second thread that is separate from the first thread. For example, the first thread can be performed by a first group of one or more of the processors and the second thread can be performed by a second group of one or more of the processors, where the second group is non-overlapping with the first group.

Each of the iterations of the iteratively generating can include generating the updated policy parameters based on minimizing a loss function in view of a group of one or more of the instances of the robot experience data in the buffer during the generating iteration.

Each of the iterations of the iteratively generating can include off-policy learning in view of a group of one or more of the instances of the robot experience data in the buffer during the generating iteration. For example, the off-policy learning can be Q-learning, such as Q-learning that utilizes a normalized advantage function (NAF) algorithm or a deep deterministic policy gradient (DDPG) algorithm.

Each of the instances of the experience data can indicate a corresponding: beginning robot state, subsequent robot state transitioned to from the beginning robot state, action executed to transition from the beginning robot state to the subsequent robot state, and reward for the action. The action executed to transition from the beginning robot state to the subsequent robot state can be generated based on processing of the beginning robot state using the policy neural network with the updated policy parameters for the corresponding episode. The reward for the action can be generated based on a reward function for the reinforcement learning policy.

The method can further include: ceasing, based on one or more criteria, the performance of the plurality of episodes and ceasing the iteratively generating; and providing, for use by one or more additional robots, the policy neural network with a most recently generated version of the updated policy parameters.

In some implementations, a method is provided that includes, by one or more processors of a given robot: performing a given episode of explorations of performing a task based on a policy network having a first group of policy parameters; providing first instances of robot experience data generated based on the policy network during the given episode; and prior to performance, by the given robot, of a subsequent episode of performing the task based on the policy network: replacing one or more of the policy parameters of the first group with updated policy parameters, where the updated policy parameters are generated based on additional instances of robot experience data, generated by an additional robot during an additional robot episode of explorations of performing the task by the additional robot; where the subsequent episode immediately follows the first episode; and where performing the task based on the policy network in the subsequent episode includes using the updated policy parameters in lieu of the replaced policy parameters.

These and other implementations disclosed herein can include one or more of the following features.

In some implementations, the method can further include generating, by one or more additional processors and during the performance of the subsequent episode, further updated policy parameters based on one or more of the first instances of robot experience data generated during the first episode. The method can further include providing the further updated policy parameters for use by the additional robot in performance of a corresponding episode by the additional robot. In some of those implementations, the additional robot starts performance of the corresponding episode during performance of the subsequent episode by the given robot and/or the further updated policy parameters are not utilized by the given robot in performance of any episodes by the given robot. In some of those implementations, the method can further include: generating, by one or more of the additional processors, yet further updated policy parameters, wherein the yet further updated policy parameters are generated during the performance of the subsequent episode and are generated subsequent to generation of the further updated policy parameters; and providing the yet further updated policy parameters for use by the given robot in performance of a further subsequent episode, by the given robot, of performing the task based on the policy network. The further subsequent episode immediately follows the subsequent episode. In some version of those implementations: the given robot starts performance of the further subsequent episode during performance of the corresponding episode by the additional robot; the updated policy parameters and the yet further updated policy parameters are not utilized by the additional robot in performance of any episodes by the additional robot; and/or the updated policy parameters are not utilized by the additional robot in performance of any episodes by the additional robot.

The policy network can include or consist of a neural network model, and each of the updated policy parameters can define a corresponding value for a corresponding node of a corresponding layer of the neural network model.

In some implementations, the method further includes, during performance of the given episode of performing the task: determining a violation, of one or more criteria for the given robot, in a given iteration of output from the policy network; modifying the output of the given iteration so that the one or more criteria are no longer violated; and generating a given instance of the instances of experience data based on the modified output. The criteria can include one or more of: joint position limits, joint velocity limits, and end effector positional limits.

In some implementations, the method further includes generating a given exploration of the explorations during the given episode by: applying a current state representation as input to the policy network, the current state representation indicating a current state of at least the given robot; generating output by processing the input using the policy network; and providing control commands to one or more actuators of the given robot based on the output. Providing the control commands to the actuators based on the output can include generating modified output by adding noise to the output; and providing the control commands based on the modified output. The output can include a velocity or a torque for each of a plurality of actuators of the robot, and providing the control commands can include providing the control commands sot that the actuators apply the velocities or torques.

Each of the first instances of the experience data can indicate a corresponding: beginning robot state, subsequent robot state transitioned to from the beginning robot state, action executed to transition from the beginning robot state to the subsequent robot state, and reward for the action.

In some implementations, a method is provided that includes receiving a given instance of robot experience data generated by a given robot of a plurality of robots. The given instance of the robot experience data is generated during a given episode of explorations of performing a task based on a given version of policy parameters of a policy network utilized by the given robot in generating the given instance. The method further includes receiving additional instances of robot experience data from additional robots of the plurality of robots. The additional instances are generated during episodes, by the additional robots, of explorations of performing the task based on the policy network. The method further includes, while the given robot and the additional robots continue the episodes of explorations of performing the task, generating a new version of the policy parameters of the policy network based on training of the policy network based at least in part on the given instance and the additional instances. The method further includes providing the new version of the policy parameters to the given robot for performing of an immediately subsequent episode of explorations of performing the task by the given robot based on the new version of the policy parameters.

These and other implementations disclosed herein can include one or more of the following features.

Receiving the given instance can occur in one iteration of a plurality of experience data iterations of receiving instances of experience data from the given robot, where the plurality of experience data iterations occurring at a first frequency. Training the reinforcement model to generate the updated parameters can include performing a plurality of training iterations including: a first training iteration of training of the policy network based at least in part on the given instance and the additional instances; and one or more additional training iterations of training of the policy network based on yet further instances of experience data from a plurality of the robots. The training iterations can occur at a second frequency that is a greater frequency than the experience data iterations.

In some implementations, a method is provided that includes iteratively receiving instances of experience data generated by a plurality of robots operating asynchronously and simultaneously. Each of the instances of experience data is generated by a corresponding robot of the plurality of robots during a corresponding episode of task exploration based on a policy neural network. The method further includes iteratively training the policy network based on the received experience data from the plurality of robots to generate one or more updated parameters of the policy network at each of the training iterations. The method further includes iteratively and asynchronously providing instances of the updated parameters to the robots for updating the policy neural networks of the robots prior to the episodes of task explorations on which the instances of experience data are based.

Other implementations may include a non-transitory computer readable storage medium storing instructions executable by one or more processors (e.g., one or more central processing units (CPUs), one or more graphics processing units (GPUs), and/or one or more tensor processing units (TPUs)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
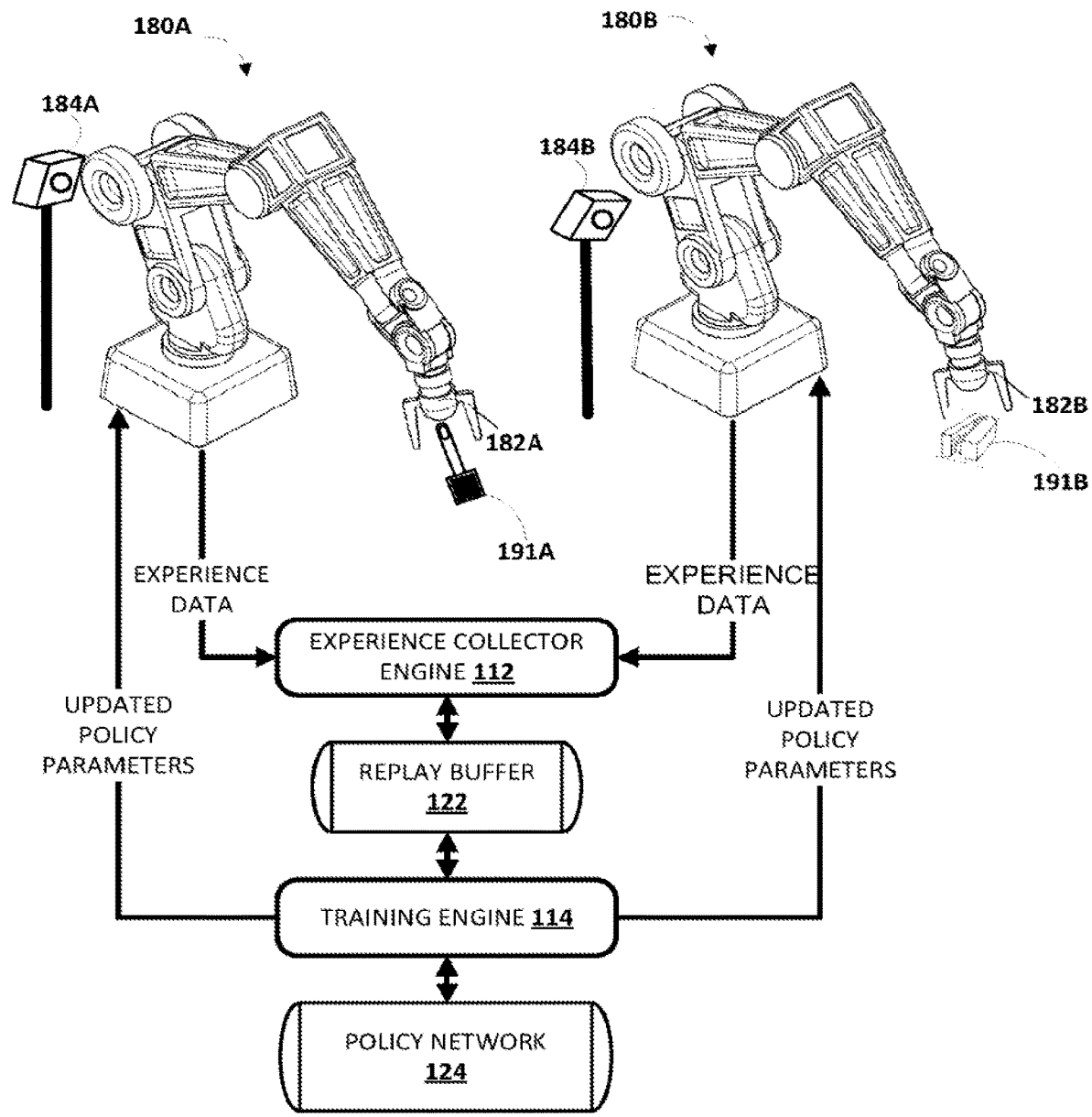
FIG. 1 illustrates an example environment in which implementations disclosed herein may be implemented.

Robotic applications of reinforcement learning often compromise the autonomy of the learning process in favor of achieving training times that are practical for real physical systems. This compromise of the reinforcement learning process may be due to introducing hand-engineered policy representations and/or human-supplied demonstrations.

Implementations of this description are directed to extensions of deep reinforcement learning methods to improve the operational performance of one or more robots. As previously described, the implementations provide operational advantages, such as efficiency gains in the physical actions carried out by the robots, and also mitigate drawbacks of prior robotic applications of reinforcement learning. These may include mitigating the need for hand-engineered policy representations (e.g., "model-based" policy representations) and/or mitigating the need for human-supplied demonstrations. In some implementations described herein, a policy neural network that parameterizes the policy is trained through deep reinforcement learning, which mitigates the need for hand-engineered policy representations. Moreover, the policy neural network can be "model-free" in that it does not explicitly learn a model of a robotic environment. As one particular example, in some implementations deep reinforcement learning algorithms based on off-policy training of deep Q-functions can scale to complex 3D manipulation tasks, and can learn deep neural network policies efficiently enough to train based on experience data generated by real physical robots. In some of those implementations, real-world (e.g., clock on the wall) training times can be reduced by parallelizing the algorithm across multiple robots which pool their policy updates asynchronously. In some of those implementations, parallelizing the algorithm across multiple robots which pool their policy updates asynchronously can additionally and/or alternatively result in a policy neural network that is more accurate and/or robust after a given number of training iterations, than if such parallelizing was not utilized. This can be due, for example, to experience data that is generated by a robot at a given instance being based on policy parameters that are updated based on both: past instances of experience data from the robot, and past instances of experience data from other robot(s) operating in parallel. Moreover, some implementations of techniques disclosed herein enable learning of three-dimensional ("3D") robotic manipulation tasks (e.g., a door opening task, a pick and place task) on real robots without necessitating any prior demonstrations or manually designed (e.g., "model-based") policy representations.

As described in more detail below, in various implementations off-policy reinforcement learning methods (e.g., Q-learning based on off-policy training of deep Q-functions) are extended to learn complex manipulation policies from scratch. In some of those various implementations, the complex manipulation policies are learned without user-provided demonstrations and/or are learned using neural network representations that do not require task-specific domain knowledge. Also, in some of those various implementations, the policies are learned using an off-policy deep Q-function algorithm, such as the Deep Deterministic Policy Gradient algorithm (DDPG) or the Normalized Advantage Function algorithm (NAF). For example, asynchronous deep reinforcement learning may be utilized, such as asynchronous deep reinforcement learning that uses a parallel NAF algorithm across a plurality of real physical robots. This may enable sample-efficient training on real robotic platforms, may enable greater time-efficiency in training by using the shared experience of multiple robots, and/or may enable more robust training due to variations between the multiple robots and/or their environments. The improved time-efficiency of the training results in, for example, the real physical robots using the improved policies to carry out physical tasks at an earlier time. This leads to technical advantages in the form of, for example, improved power consumption at the robots at earlier stage and/or, for example, a lower overall rate of wear to robotic joints due to earlier improvements in the policies and resulting physical actions of the robots.

In some past applications of pooling experience from multiple robots (collective robotic learning), those applications seek to reduce overall training time, under the assumption that simulation time is inexpensive and the training is dominated by neural network backpropagation. In contrast, some implementations of this description seek to minimize the training time when training based on data from real physical robots, where experience is expensive and neural network backpropagation is comparatively cheap. For example, various implementations disclosed herein collect experience data from multiple robots that operate asynchronously from one another. Moreover, various implementations utilize the collected experience data in training a policy neural network asynchronously from (but simultaneous with) the operation of the multiple robots. For example, a buffer of the collected experience data from an episode of one of the robots can be utilized to update the policy neural network, and updated policy parameters from the updated policy neural network provided for implementation by one or more of the multiple robots before performance of corresponding next episodes. In this manner, collection of experience data can be asynchronous among multiple robots and asynchronous to the updating of the policy neural network. However, the multiple robots can each utilize updated policy parameters at each episode, where those updated policy parameters are based on experience data from past episodes of the robot and past episodes of other robots. Such asynchronous execution and neural network training may achieve a speedup in overall training time as a result of simultaneously collecting experiences across multiple robotic platforms.

In real robot environments, particularly those with contact events, environment dynamics are often not available or cannot be accurately modeled. In view of this, implementations disclosed herein focus on model-free reinforcement learning, which includes policy search methods and value-iteration methods. While policy search methods offer a direct way to optimize a true objective, they often require significantly more data than value iteration methods because of on-policy learning. Accordingly, some implementations disclosed herein focus particularly on value iteration methods, such as value iteration methods based on Q-learning with function approximation. Two examples of value iteration methods are DDPG and NAF, which extend deep Q-learning to a continuous action space and are more sample-efficient than competing policy search methods due to, for example, off-policy learning through a replay buffer.

The goal in reinforcement learning is to control an agent attempting to maximize a reward function which, in the context of a robotic skill (also referred to herein as a task), denotes a user-provided definition of what the robot should try to accomplish. At state $x_t$ in time t, the agent chooses and executes action $u_t$ according to its policy $\pi(u_t|x_t)$, transitions to a new state $x_t$ according to the dynamics $p(x_t|x_t,u_t)$, and receives a reward $r(x_t,u_t)$. In implementations described herein, infinite-horizon discounted return problems are considered. The objective of infinite-horizon discounted return problems is the $\gamma$-discounted future return from time t to T, given by $R_t=\Sigma_{i=t}^{T}\gamma^{(i-t)}r(x_i,u_i)$. The goal is to find the optimal policy $\pi^*$ which maximizes the expected sum of returns from the initial state distribution, given by $R=\mathbb{E}_{r_{i\geq1},x_{i\geq1}\sim E,u_{i\geq1}\sim\pi}[R_1]$.

Among reinforcement learning methods, off-policy methods such as Q-learning may offer data efficiency gains as compared to on-policy variants. This may be beneficial for robotic applications. Q-learning learns a greedy deterministic policy $\pi(u_t|x_t)=\delta(u_t=\mu(x_t))$ by iterating between learning the Q-function, $Q^{\pi_n}(x_t,u_t)=\mathbb{E}_{r_{i\geq t},x_{i>t}\sim E,u_{i>t}\sim\pi_n}[R_t|x_t,u_t]$, of a policy and updating the policy by greedily maximizing the Q-function, $\mu_{n+1}(x_t)=\arg\max_u Q^{\pi_n}(x_t,u_t)$. $\theta^Q$ parametrizes the action-value function, $\beta$ is an arbitrary exploration policy, $p^\beta$ and is the state visitation induced by $\beta$, the learning objective is to minimize the Bellman error, where the target $y_t$ is fixed as:

$$L(\theta^Q)=\mathbb{E}_{x_t\sim p^\beta,u_t\sim\beta,x_{t+1},r_t\sim E}[(Q(x_t,u_t|\theta^Q)-y_t)^2]$$

$$y_t=r(x_t,u_t)+\gamma Q(x_{t+1},\mu(x_{t+1}))$$

For continuous action problems, the policy update step can be intractable for a Q-function parametrized by deep neural networks. Accordingly, extensions of Q-learning with function approximation may be utilized in various implementations described herein. Two examples of extensions of Q-learning with function approximation are DDPG and NAF. DDPG circumvents the intractability problem by adopting actor-critic method, while NAF restricts classes of Q-function to the expression below to enable closed-form update as in the discrete action case. During exploration, a temporally-correlated noise may optionally be added to the policy network output.

$$Q(x,u|\theta^Q)=A(x,u|\theta^A)+V(x|\theta^V)$$

$$A(x,u|\theta^A)=-\tfrac{1}{2}(u-\mu(x|\theta^\mu))^T P(x|\theta^P)(u-\mu(x|\theta^\mu))$$

This reinforcement learning formulation can be applied on robotic systems to learn a variety of robotic skills defined by reward functions. However, the learning process is typically time consuming. Accordingly, in implementations disclosed herein, a parallelized variant of NAF or a parallelized version of DDPG may be utilized to alleviate one or both of these concerns. This may enable learning a neural-network parametrized Q-function from scratch on complex real robot tasks. In practical deep robotic learning applications, the learning time is constrained by the data collection rate of real robots, which is limited to real time, rather than network training speed. Accordingly, various implementations disclosed herein propose use of asynchronous NAF to effectively use multiple real robots for data collection and increase the real-world speed of learning. This, of course, achieves a more rapid improvement in real-word robot performance, together with corresponding efficiency gains as previously discussed, when the learned policies are implemented by the robots carrying out physical tasks. Moreover, various implementations disclosed herein achieve aggressive exploration during Q-learning (e.g., by adding large temporally-correlated noise to policy network output to increase a degree of exploration), which may be beneficial and/or required when learning from scratch. In some of those implementations, techniques may also be employed to achieve aggressive exploration while minimizing or preventing violation of one or more criteria of the robots performing the exploration (e.g., safety criteria and/or other criteria).

In implementations of asynchronous NAF disclosed herein, the trainer thread(s) (that update/train the policy neural network) are separated from the experience collector thread(s) (which each collect experience data from one or more robots during exploration). In some of those implementations, the decoupling between the training and the collector threads may ensure that the difference in training speed does not halt control programs of the robots generating the experience data, which are often required to send controls at fixed frequencies. While the trainer thread(s) keep training from a replay buffer (populated by the experience collector thread(s)), the experience collector thread(s) each sync their policy parameters with the trainer thread(s) at the beginning of each episode (e.g., update their policy neural network with updated parameters generated in a most recent iteration of the training thread), execute commands on the robots, and push instances of experience data into the replay buffer.

Presented below is an overview of one example algorithm for performing asynchronous NAF with N collector threads and one training thread. Although the example algorithm is presented with one training thread, in some implementations multiple training threads may be provided (e.g., distributed training across multiple threads).

---

// trainer thread
Randomly initialize normalized Q network $Q(x, u|\theta^Q)$,
where $\theta^Q = \{\theta^\mu, \theta^P, \theta^V\}$
Initialize target network $Q'$ with weight $\theta^{Q'} \leftarrow \theta^Q$.
Initialize shared replay buffer $R \leftarrow \emptyset$
for iteration = 1,/do
  Sample a random minibatch of m transitions from R
  Set $y_i = \begin{cases} r_i + \gamma^{V'}(x_i' \mid \theta^{Q'}) & \text{if } t_i < T \\ r_i & \text{if } t_i = T \end{cases}$
  Update the weight: $\theta^Q$ by minimizing the loss:
  $L = \frac{1}{m}\sum_i (y_i - Q(x_i, u_i \mid \theta^Q))^2$
  Update the target network: $\theta^{Q'} \leftarrow \tau\theta^Q + (1-\tau)\theta^{Q'}$
end for
// collector thread n, n = 1 ... N
Randomly initialize policy network $\mu(x|\theta_n^\mu)$
for episode = 1, M do
  Sync policy network weight $\theta_n^\mu \leftarrow \theta^\mu$
  Initialize a random process $\mathcal{N}$ for action exploration
  Receive initial observation state $x_1 \sim p(x_1)$
  for t = 1, T do
    Select action $u_t = \mu(x_t|\theta_n^\mu) + \mathcal{N}_t$
    Execute $u_t$ and observe $r_t$ and $x_{t+1}$
    Send transition $(x_t, u_t, r_t, x_{t+1})$ to R (shared replay buffer)
  end for
end for

---

As described herein, in various implementations a neural network may parametrize the action-value functions and policies. In some of those implementations, various state representations may be utilized, as input to the model, in generating output indicative of an action to be implemented based on the policies. The state representations can indicate the state of the robot and optionally the state of one or more environmental objects. As one example, a robot state representation may include joint angles and end-effector positions, as well as their time derivatives. In some implementations, a success signal (e.g., a target position) may be appended to a robot state representation. As described herein, the success signal may be utilized in determining a reward for an action and/or for other purposes. The particular success signal will depend on the task for which reinforcement learning is taking place. For example, for a reaching task, the success signal may be the goal/target position for the end-effector. As another example, for a door opening task, the success signal may include the handle position when the door is closed and the quaternion measurement of a sensor attached to the door frame (e.g., an inertial measurement unit attached to the door frame). In various implementations, standard feed-forward networks can be utilized as a policy neural network to parametrize the action-value functions and policies. As one example, two-hidden-layer network with size 100 units each may be used to parametrize each of m(x), L(x) (Cholesky decomposition of P(x)), and V(x) in NAF and m(x) and Q(x;u) in DDPG. For Q(x;u) in DDPG, the action vector u may be added as another input to a second hidden layer followed by a linear projection. ReLU may be used as hidden activations and hyperbolic tangent (Tanh) may be used for final layer activation only in policy networks m(x) to bound the action scale.

As described herein, in some implementations techniques may be employed to achieve aggressive exploration while minimizing or preventing violation of one or more criteria of the robots performing the exploration (e.g., safety criteria and/or other criteria). In some of those implementations, the criteria may include velocity limits for each joint of a robot, position limits of each joint of a robot, and/or other kinematic and/or dynamic constraints of the robot. For example, if a commanded output (e.g., by the policy network being utilized) during exploration by a robot indicates a velocity for a joint that would exceed its velocity limit, that velocity may be modified (e.g., scaled back to the velocity limit) prior to implementation of the output or, alternatively, an error may be thrown and a new episode of exploration may begin.

In some implementations, a bounding sphere (or other bounding shape(s)) for an end effector position may be utilized as criteria. If a commanded output during exploration by a robot would send the end effector of the robot outside of the bounding sphere, the forward kinematics of the robot may be utilized to project the commanded velocity onto the surface of the sphere, plus some correction velocity. Additional and/or alternative criteria may be utilized. For example, when exploration is being performed to learn certain tasks, such as opening/closing doors, criteria may be provided to prevent the robot from pushing too hard against certain objects (e.g., the door). For instance, an additional bounding plane may be added several centimeters in front of a closed position of a door and/or torque limits may be added to one or more joints of the robot (e.g., so that if the commanded velocities could not be achieved, due to contacts with the door or handle, the robot would not apply an excessive amount of torque).

Figure 2:
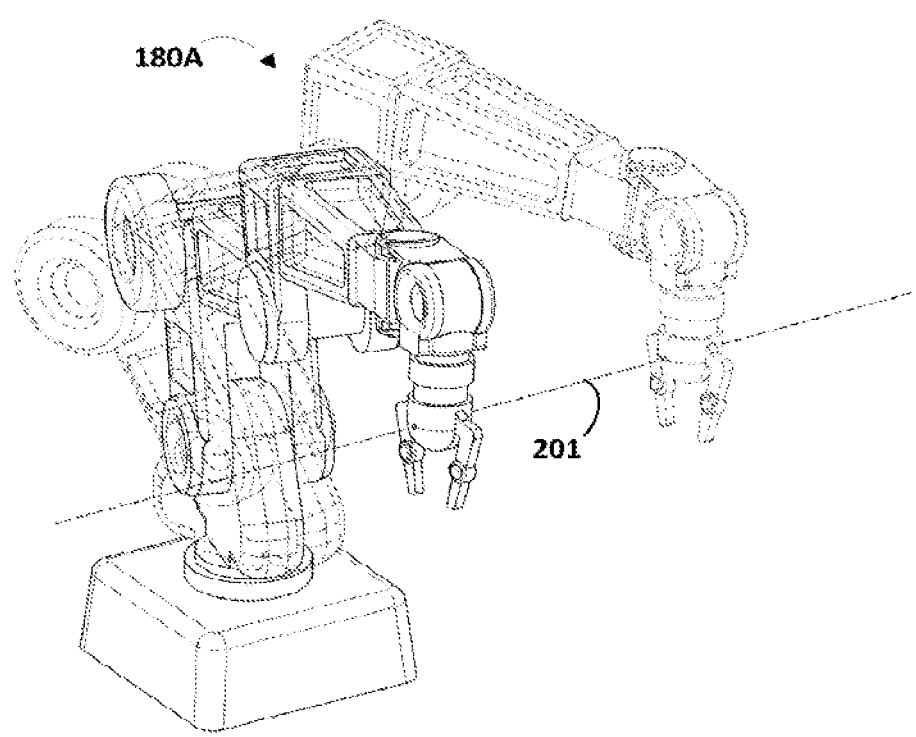
FIG. 2 illustrates one of the robots of FIG. 1 and an example of movement of a grasping end effector of the robot along a path.

With reference now to the figures, additional description of the above and additional implementations is provided. FIG. 1 illustrates an example environment in which implementations disclosed herein may be implemented. Example robots 180A and 180B are included in FIG. 1. Robots 180A and 180B are "robot arms" having multiple degrees of freedom to enable, through movement of the robots, a traversal of grasping end effectors 182A and 182B along any of a plurality of potential paths to position the grasping end effectors 182A and 182B in desired locations. For example, with reference to FIG. 2, an example of robot 180A traversing its end effector along a path 201 is illustrated. FIG. 2 includes a phantom and non-phantom image of the robot 180A showing two different poses of a set of poses struck by the robot 180A and its end effector in traversing along the path 201. Referring again to FIG. 1, robots 180A and 180B each further controls the two opposed "claws" of their corresponding grasping end effector 182A, 182B to actuate the claws between at least an open position and a closed position (and/or optionally a plurality of "partially closed" positions).

Example vision sensors 184A and 184B are also illustrated in FIG. 1. In FIG. 1, vision sensor 184A is mounted at a fixed pose relative to the base or other stationary reference point of robot 180A. Vision sensor 184B is also mounted at a fixed pose relative to the base or other stationary reference point of robot 180B. As illustrated in FIG. 1, the pose of the vision senor 184A relative to the robot 180A is different than the pose of the vision sensor 184B relative to the robot 180B. As described herein, in some implementations this may be beneficial to provide diversity of experience data generated by each of the robots 180A and/or 180B (if the experience data is influenced at least in part by sensor data from the vision sensors 184A and 184B). Vision sensors 184A and 184B are sensors that can generate images or other vision data related to shape, color, depth, and/or other features of object(s) that are in the line of sight of the sensors. The vision sensors 184A and 184B may be, for example, monographic cameras, stereographic cameras, and/or 3D laser scanner. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision sensor 184A has a field of view of at least a portion of the workspace of the robot 180A, such as the portion of the workspace that includes example spatula 191A. Although a resting surface for spatula 191A is not illustrated in FIG. 1, it may rest on a table, a bin, and/or other surface(s). In other implementations more objects, fewer objects, additional objects, and/or alternative objects may be provided during one or more episodes performed by robot 180A as described herein. Each of the episodes may be an exploration in performing a task that involves corresponding ones of the spatula 191A and stapler 191B (e.g., to touch the objects, to "pick and place" the objects). Additional and/or alternative objects may be provided. For example, for an "open a door" task, a door may be provided in the environment of each of the robots 180A and 180B. The vision sensor 184B has a field of view of at least a portion of the workspace of the robot 180B, such as the portion of the workspace that includes example stapler 191B. Although a resting surface for stapler 191B is not illustrated in FIG. 1, it may rest on a table, a bin, and/or other surface(s). In other implementations more objects, fewer objects, additional objects, and/or alternative objects may be provided during one or more episodes performed by robot 180B as described herein.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized. For example, end effectors that are incapable of grasping may be utilized. Additionally, although particular mountings of vision sensors 184A and 184B are illustrated in FIG. 1, additional and/or alternative mountings may be utilized—or the vision sensors may be omitted. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a plurality of episodes that are each explorations of performing a task based on a model-free reinforcement learning network. For example, robot 180A and robot 180B may each include a policy network, such as a deep neural network that represents a deterministic policy function. At the beginning of an episode, a current state of the robot (e.g., a pseudo-randomly selected starting state) may be applied as input to the policy network along with a success signal (e.g., a target position of an end-effector for a reaching task), and an output generated over the policy network based on the input. The policy network output indicates an action to be performed in a next control cycle of the robot. For example, the policy network output may be velocity commands, in joint space, for each of the actuators of the robot. As another example, the policy network output may be motor torques for each of the actuators of the robot. The action is then implemented by the robot. The state of the robot after implementing the action can then be applied as input to the policy network along with the success signal, and an additional output generated over the network based on the input. This may continue to be performed iteratively (e.g., at each control cycle of the robot) until the success signal is achieved (e.g., as determined based on a reward satisfying a criteria) and/or other criteria is met. The other criteria can be, for example, that a temporal duration of the episode has satisfied a threshold (e.g., X seconds) or that a threshold quantity of control cycles has occurred. A new episode may begin after the success signal and/or other criteria is met.

As illustrated in FIG. 1 and described in more detail herein, the experience collector engine 112 receives instances of experience data generated by the robot 180A and the robot 180B (and optionally additional robot(s)) while they are performing episodes. For example, robot 180A may provide a new instance of experience data to the experience collector engine 112 at each of its control cycles while performing an episode. As another example, the robot 180A can provide all instances of experience data generated during an episode to the experience collector engine 112 at the conclusion of the episode. As yet another example, the robot 180A can provide new instances of experience data every 0.2 seconds or at other regular or non-regular interval(s). Each instance of experience data is generated by a corresponding robot based on input applied to, and/or output generated over, the policy network of the robot in a corresponding iteration. For example, each instance of experience data may indicate a current state of the robot, an action to be performed based on the output of the policy network, a state of the robot after implementation of the action, and/or a reward for the action (as indicated by the output generated over the policy network and/or a separate reward function).

The experience collector engine 112 stores received instances of experience data in replay buffer 122. The replay buffer 122 can include memory and/or a database that is accessible to training engine 114. Although a single experience collector engine 112 is illustrated, it is understood that multiple experience collector engines 112 may be provided. For example, each robot may include or be associated with its own experience collector engine and the engines may all store the instances of experience data in the replay buffer 122.

The training engine 114 iteratively trains one or more parameters of the policy network 124 utilizing techniques such as those described herein (e.g., those related to Q-learning such as the NAF and/or DDPG variants). At each iteration of training, the training engine 114 may generate updated policy parameters utilizing a group of one or more instances of experience data of the replay buffer 122. The training engine 114 may optionally clear the utilized instance(s) from the replay buffer 122 and/or they may be otherwise cleared (e.g., based on a first in first out scheme).

Prior to each performance of a new episode by either of the robots 180A and 180B, the robot may update its policy network with the policy parameters that have been most recently generated by the training engine 114. In some implementations, the policy parameters may be "pushed" by the training engine 114 to the robots 180A and 180B. In some other implementations, the policy parameters may be "pulled" by the robots 180A and 180B. Accordingly, in implementations of FIG. 1, the robot 180A, the robot 180B, and optionally additional robots may operate in parallel while each are performing a plurality of episodes based on the same model-free reinforcement policy network. However, the policy parameters utilized by one or more of the robots may be different from one or more other of the robots at one or more times. For example, at time T1 and prior to the beginning of a given episode, robot 180A may sync its policy parameters with the most recently updated policy parameters. However, at time T1 robot 180B may be in an episode and may still be operating under less updated policy parameters from a prior iteration (immediately prior or multiple iterations prior) of the training engine 114. At time T2, the robot 180B may sync its policy parameters with yet further updated policy parameters, but the robot 180A may still be in the given episode at time T2 and still operating under the (now less) updated policy parameters of time T1.

As described herein, instances of experience data of each of robots 180A, 180B, and/or other robots may be added to the replay buffer 122 by the experience collector engine 112 as those instances of experience data are generated during parallel operation of the robots. In some implementations, the experience data of each of the robots may be added to the replay buffer 122 at corresponding (and optionally the same) frequencies of the robots (e.g., at control cycle frequencies of the robots). For example, a robot can have a control frequency of 60 Hz and provide experience data at 60 Hz (i.e., provide 60 instances of experience data every second). In some of those implementations, the training engine 114 may perform training iterations at a frequency that is greater than one or more (e.g., all) of the frequencies of the robots—and may perform those iterations while the robots continue to operate in parallel and generate experience data based on episodes. One or more of these techniques may enable convergence of a policy network to occur more quickly than if such techniques were not employed.

Experience collector engine 112, replay buffer 122, training engine 114, and policy network 124 are illustrated in FIG. 1 as separate from the robots 180A and 180B. However, in some implementations, all or aspects of one or more of those components may be implemented on robot 180A and/or robot 180B (e.g., via one or more processors of robots 180A and 180B). For example, robots 180A and 180B may each include an instance of the experience collector engine 112. In some implementations, all or aspects of one or more of those components may be implemented on one or more computer systems that are separate from, but in network communication with, robots 180A and 180B. In some of those implementations, experience data can be transmitted from a robot to the components over one or more networks, and updated policy parameters can be transmitted from the components to the robot over one or more of the networks.

Figure 3:
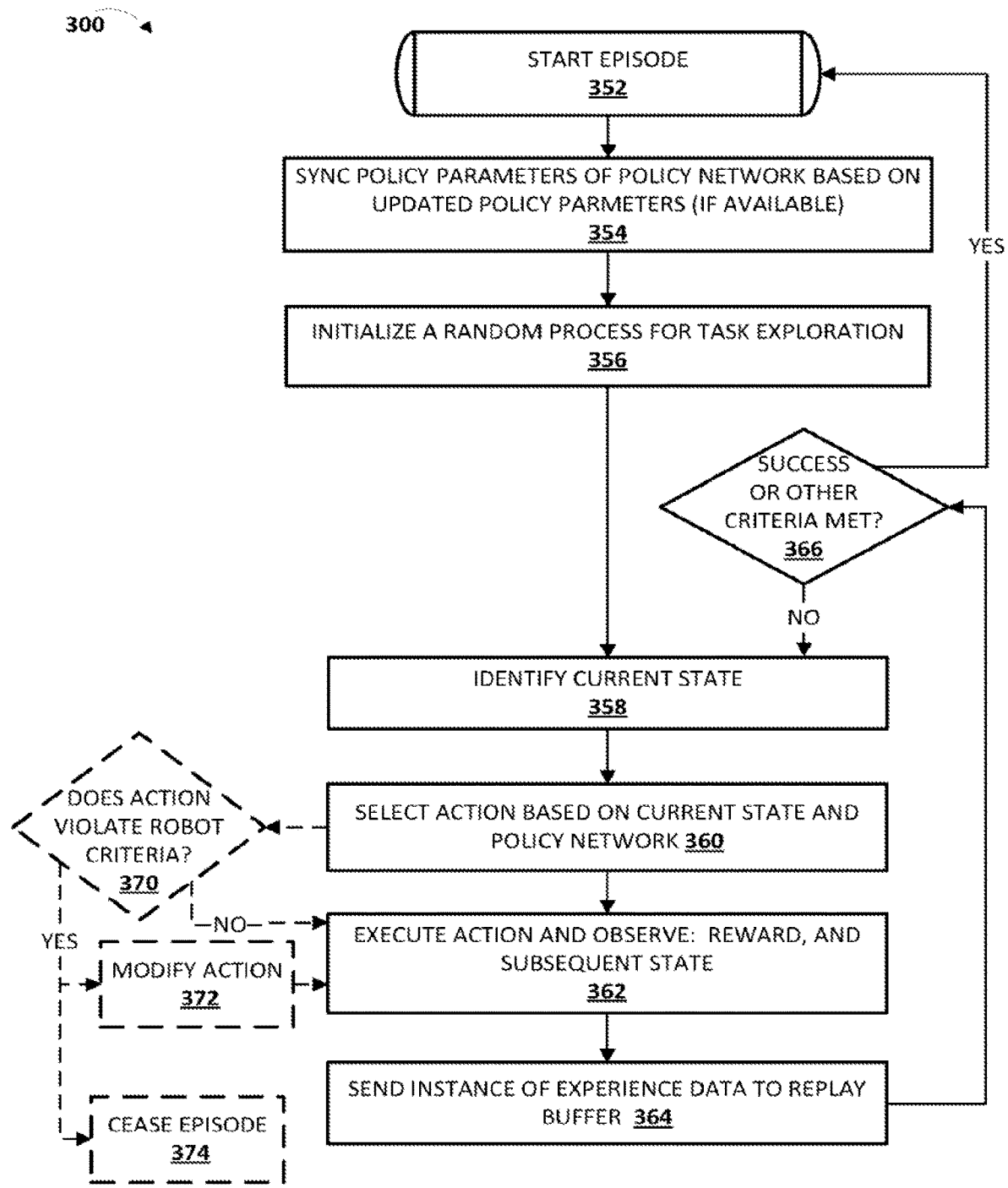
FIG. 3 is a flowchart illustrating an example of performing an episode by a robot.

FIG. 3 is a flowchart illustrating an example method 300 of performing object motion attempts and storing data associated with the object motion attempts. For convenience, the operations of the flow chart are described with reference to a system that performs the operations. This system may include one or more components of a robot, such as a processor and/or robot control system of robot 180A, 180B, 640, and/or other robot. Moreover, while operations of method 300 are shown in a particular order, this is not meant to be limiting. One or more operations may be reordered, omitted or added.

At block 352, an episode starts to perform a task.

At block 354, the system syncs policy parameters of a policy network used by the system based on updated parameters, if any updated parameters are available. For example, the system may replace one or more policy parameters of the policy network with one or more recently updated policy parameters generated based on the method 500 of FIG. 5. In some implementations, replacing a policy parameter with another policy parameter comprises replacing a value, of a node of a neural network model, with another value.

At block 356, the system initializes a random process for task exploration. As used herein, random includes pseudo-random as well as truly random. As one example, the system may cause an end effector of the robot to move to a random starting position. As another example, the system may cause each of the joints of the robot to each assume a particular motion state (e.g., particular position, velocity, and/or acceleration).

At block 358, the system identifies a current state. The current state can include the current robot state and/or the current state of one or more environmental objects. The current state of the environmental objects can be determined based on sensors attached to those environmental objects and/or based on sensor data from the robot. For example, the current state of an environmental object can be based on sensor data from one or more sensors, such as an inertial measurement unit ("IMU") attached to a door when the task is to open the door. Also, for example, the current state of an environmental object can be based on vision sensor data captured by a vision senor of the robot (e.g., a current position of an object can be determined based on vision sensor data from a vision sensor of the robot). At the first iteration of block 358 the robot state of the current will be the initial robot state after the initialization of block 356. For example, the initial robot state may include the current state of one or more components of the robot such as positions, velocity, and/or acceleration of each of the joints, and/or of the end-effector.

At block 360, the system selects an action to implement based on the current state and based on the policy network. For example, the system may apply the current state as input to a reinforcement learning policy model and generate, over the model based on the input, output that indicates an action to implement. The system may select the action based on the output. In some implementations, the output includes torque values and/or other values to apply to actuators of a robot, and selecting the action can comprise selecting those values as the action. In implementations where additional and/or alternative current observations are identified at bock 358, they may also be applied as input to the policy network.

At block 362, the system executes the action and observes the reward and the subsequent state that results from the action. For example, the system may generate one or more motion commands to cause one or more of the actuators to move and effectuate the action. The system may observe the reward based on a reward function and optionally based on a success signal provided to the system. For example, the reward function for a task of an end effector reaching a target pose may be based on a difference between a pose of the end effector that results from the action and the target pose (where the target pose is provided as a success signal). The subsequent state can include a subsequent robot state and/or a subsequent state of one or more environmental objects. For example, the subsequent robot state may include the state of one or more components of the robot as a result of the action, such as positions, velocity, and/or acceleration of each of the joints, and/or of the end-effector. In some implementations, at block 362 the system additionally or alternatively identifies other observations as result of the action, such as vision sensor data captured by a vision sensor of the robot after implementation of the action and/or other sensor data from other sensor(s) after implementation of the action.

At block 364, the system sends an instance of experience data to a replay buffer. For example, the system may itself store the instance in the replay buffer or provide the instance to a separate component that stores the instance in the replay buffer. As described with respect to method 500 of FIG. 5, the instance and other instances from other robots may be used during training to update the policy parameters. In some implementations, the experience data may include data indicating the current state of block 358, the action of 360, and/or the observed reward and/or subsequent state of block 362.

At block 366, the system determines if success or other criteria has been met. For example, the system may determine success if the reward observed at block 362 satisfies a threshold. Also, for example, another criteria may be that a threshold time and/or threshold number of iterations of blocks 358, 360, 362, and 364 have been satisfied.

If the system determines success or other criteria has been met, the system proceeds to block 352 and starts a new episode. It is noted that in the new episode the system can, at block 354 of the new episode, sync the policy parameters with one or more updated parameters that are updated relative to those in the immediately preceding episode (as a result of simultaneous updating of those parameters per method 500 of FIG. 5 and/or other methods). For example, the updated parameters can be updated per method 500 of FIG. 5 utilizing experience data from one or more other robots that are asynchronously generating experience data according to the method 300 of FIG. 3. In these and other manners, each episode of FIG. 3 can utilize policy parameters that are updated based on experience data from other robot(s). This can result in each episode generating experience data that enables more efficient training. Multiple episodes may be performed by the system utilizing method 300 until training (per method 500 of FIG. 5 and/or other methods) is completed and/or until some other signal is received (e.g., an error occurs).

If the system determines success or other criteria has not been met, the system proceeds to block 358 and performs an additional iteration of blocks 358, 360, 362, and 364.

In FIG. 3, blocks 370, 372, and 374 are also illustrated and represent optional blocks that may be implemented to determine if any of the actions of block 360 violate one or more criteria for the robot and, if so, to take a corrective action prior to execution of the action at block 362. At block 370, the system determines whether the action of block 360 violates one or more robot criteria. If not, the system proceeds to block 362 and executes the action.

If the system determines the action of block 360 does violate one or more robot criteria, the system proceeds to block 372 or block 374. At block 372, the system may modify the action so that it no longer violates the criteria, and provide the modified action for execution at block 362 in lieu of the action. For example, if the violation is of a velocity constraint, the action may be modified so that the velocity constraint is no longer violated. The modified action can be provided in the instance of experience data in lieu of the non-modified action.

At block 374 the system may optionally cease the episode in response to certain violations of robot criteria. If the system ceases the episode at block 374, the system may return to block 352 and/or wait for intervention (e.g., human intervention).

As described herein, in many implementations, the method 300 of FIG. 3 may be implemented on each of a plurality of robots operating in parallel during one or more (e.g., all) of their respective iterations of method 300. For example, one or more processors of a first robot can be performing an instantiation of method 300, one or more processors of a second robot can be performing an instantiation of method 300, etc. This may enable more instances of experience data to be generated in a given time period than if only one robot was operating the method 300. This can result in time-efficient training of a policy neural network in implementations where training of the policy neural network occurs at a greater frequency than generation of experience data by a given robot. Additionally, this can enable each episode of the method 300 by a given robot to utilize experience data that is updated based on experience data from other robot(s). This can result in training of a policy neural network that converges in fewer iterations than if asynchronous training based on asynchronous experience data was not utilized. Moreover, in implementations where end effectors, sensors, actuators, and/or other hardware components of the plurality of robots vary and/or wear differently, and/or in which different robots interact with different objects (e.g., objects of different sizes, different weights, different shapes, different translucencies, different materials) and/or in different environments (e.g., different surfaces, different lighting, different environmental obstacles), utilization, in training, of experience data generated by the plurality of robots may provide robustness, in the trained policy network, to various robotic and/or environmental configurations.

Figure 4:
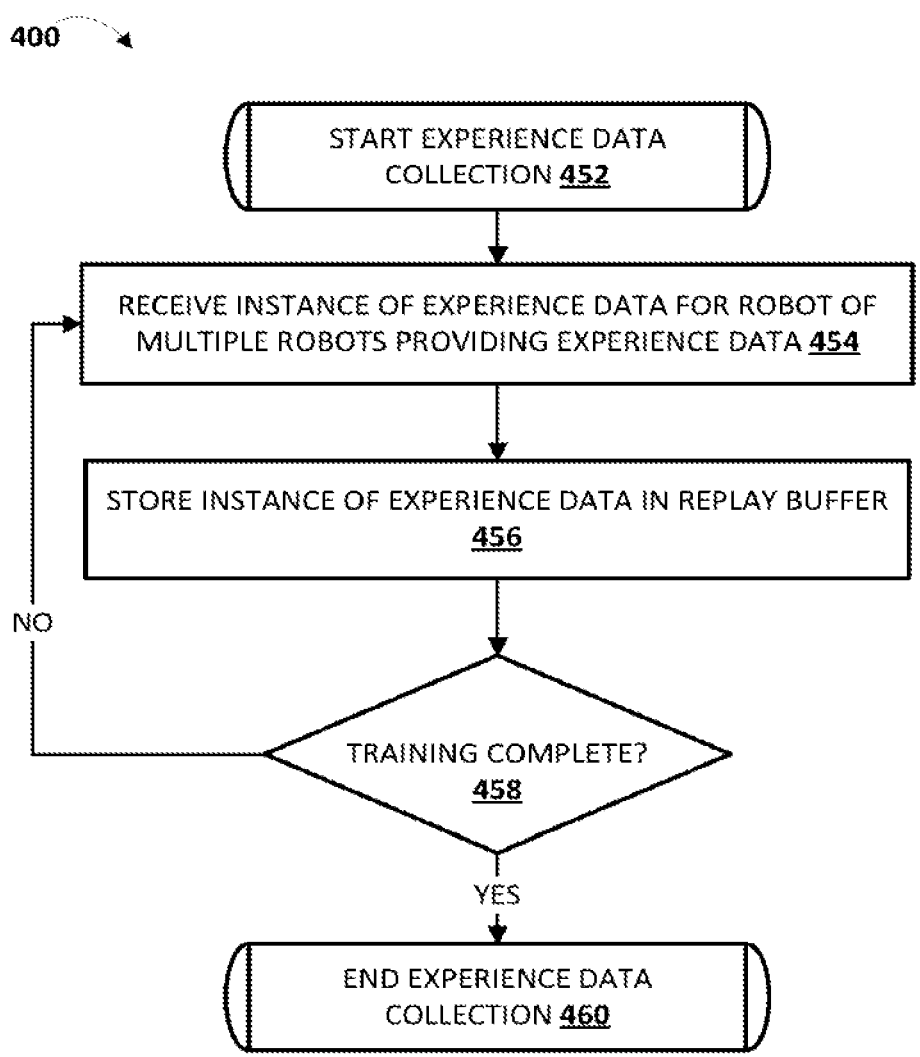
FIG. 4 is a flowchart illustrating an example method of storing instances of experience data.

FIG. 4 is a flowchart illustrating an example method 400 of storing instances of experience data. For convenience, the operations of the flow chart are described with reference to a system that performs the operations. This system may include one or more components of one or more computer systems, such as a processor and/or may include one or more components of one or more robots, such as a processor and/or robot control system of a robot. Moreover, while operations of method 400 are shown in a particular order, this is not meant to be limiting. One or more operations may be reordered, omitted or added.

At block 452, experience data collection starts.

At block 454, the system receives an instance of experience data for a robot. The robot is one of multiple robots providing experience data to the system and/or other systems in parallel (but optionally at different frequencies). For example, the robots may each be implementing the method 300 of FIG. 3 and block 454 may be performed in response to each instance of performance of block 364 of the method 300.

At block 456, the system stores the instance of experience data in a replay buffer. At block 458, the system determines whether training is complete. The system may determine training is complete in response to a signal from an optionally separate training system that is updating policy parameters based on the experience data stored in the replay buffer.

If the system determines at block 458 that training is not complete, the system returns to block 454 and receives an additional instance of experience data (from the same robot or a different robot). It is understood that multiple threads of one or more of the blocks of method 400 may be implemented to enable simultaneous receipt of experience data from multiple robots.

If the system determines at block 458 that training is complete, the experience data collection ends at block 460.

Although method 300 and method 400 are illustrated in separate figures herein for the sake of clarity, it is understood that one or more blocks of method 400 may be performed by the same component(s) that perform one or more blocks of the method 300. For example, one or more (e.g., all) of the blocks of method 300 and the method 400 may be performed by processor(s) of a robot. Also, it is understood that one or more blocks of method 400 may be performed in combination with, or preceding or following, one or more blocks of method 300.

Figure 5:
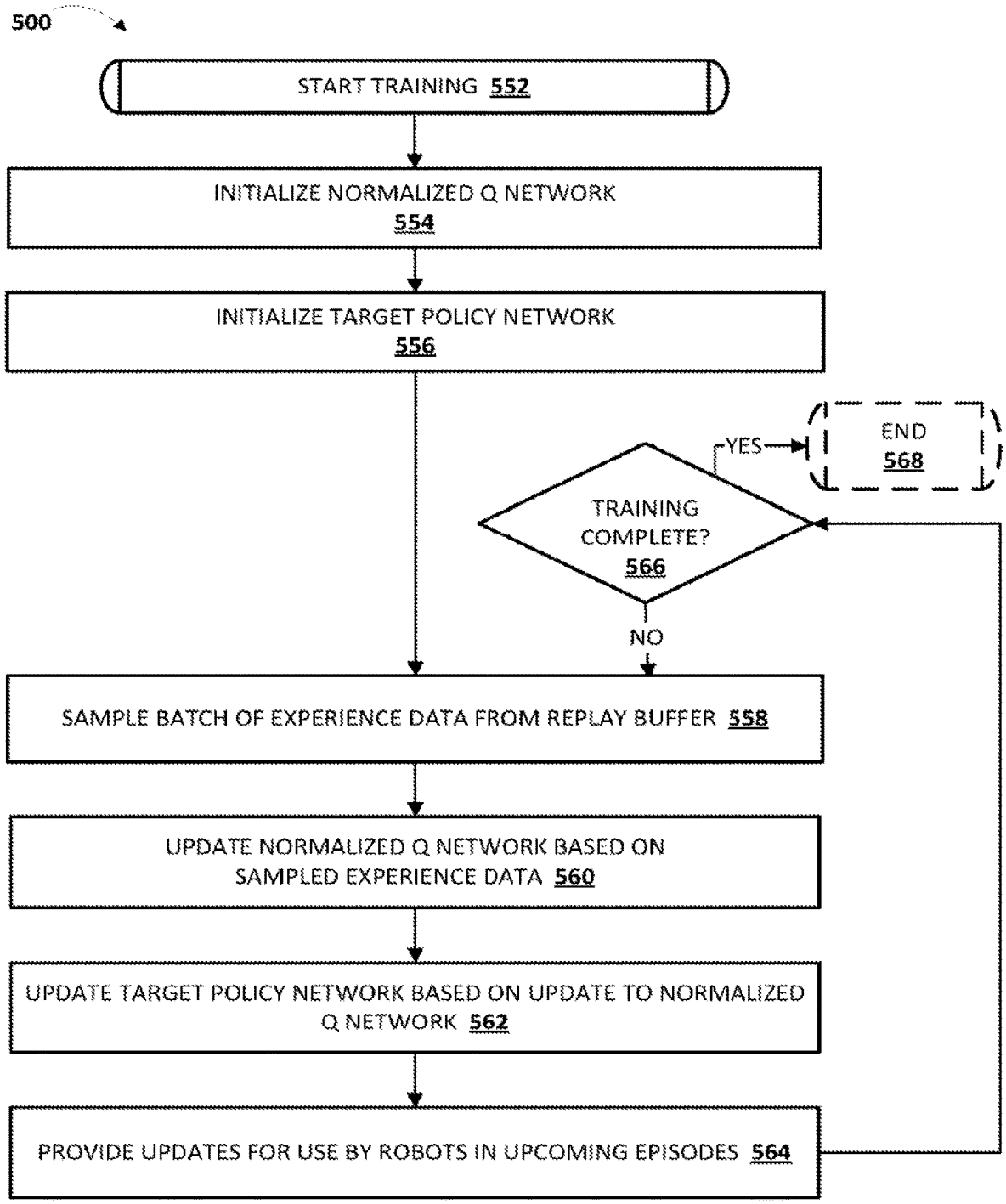
FIG. 5 is a flow chart illustrating an example method of training to update parameters of a policy network.

FIG. 5 is a flowchart illustrating an example method 500 of training to update parameters of a policy network. For convenience, the operations of the flow chart are described with reference to a system that performs the operations. This system may include one or more components of a computer system, such as a processor (e.g., a GPU and/or CPU) of training engine 114 and/or other computer system. Moreover, while operations of method 500 are shown in a particular order, this is not meant to be limiting. One or more operations may be reordered, omitted or added.

At block 552, training starts.

At block 554, the system initializes a normalized Q network, such as a normalized Q network that parameterizes a randomly initialized Q-function estimate. For example, the system may initialize the normalized Q network $Q(x,u|\theta^Q)$, where $\theta^Q = \{\theta^\mu, \theta^P, \theta^V\}$.

At block 556, the system initializes a target policy network, which outputs actions that are inputs to the normalized Q network initialized at block 554. For example, the system may initialize a target policy network $Q'$ with weight $\theta^{Q'} \leftarrow \theta^Q$.

At block 558, the system samples a batch of experience data from a replay buffer. For example, the system may sample of batch of one or more instances of experience data stored in a replay buffer based on the method 300 of FIG. 3 and/or the method 400 of FIG. 4.

In some implementations, for the experience data, the system sets $$y_i = \begin{cases} r_i + \gamma^{V'}(x_i' | \theta^{Q'}) & \text{if } t_i < T \\ r_i & \text{if } t_i = T \end{cases}$$

At block 560, the system updates the normalized Q network based on the experience data sampled at block 558. For example, the system may perform backpropagation and/or other techniques on the Ct network based on a loss function. For instance, the system may update the weight $\theta^Q$ of the Q network by minimizing the loss:

$$L = \frac{1}{m} \sum_i (y_i - Q(x_i, u_i | \theta^Q))^2.$$

At block 562, the system updates the target policy network based on the update to the normalized Q network. For example, the system may update the target policy network based on the gradient of the loss function with respect to the network parameters. For instance, the system may update the target policy network based on: $\theta^{Q'} \leftarrow \tau \theta^Q + (1-\tau) \theta^{Q'}$.

At block 564, the system provides updates for use by robots in upcoming episodes. For example, the system may provide updated policy parameters and/or other parameters for use by the robots in upcoming episodes.

At block 566, the system determines whether training is complete. In some implementations, determining that training is complete may be based on: determining that convergence has been achieved, a threshold quantity of iterations of blocks 558-564 have occurred, all available experience data has been processed, a threshold amount of time has passed, and/or other criteria has been satisfied.

If the system determines training is complete, the training ends at block 568. If the system determines training is not complete, the system proceeds back to block 558. As described herein, method 500 may be performed simultaneous with methods 300 and 400 described herein. In some of those implementations, the frequency of performance of an iteration of the method 500 may be greater than the frequency of the performance of an iteration of the method 300 and/or 400. As one non-limiting example, the method 500 may be performed at a rate of 100 Hz and the method 300 may be performed at a rate of 20 Hz. It is noted that in some implementations method 300, method 400, and/or method 500 may be performed "continuously" in that experience data is continuously generated by one or more real world robots, and utilized to continuously update the target policy network.

To provide some additional detail on implementations described herein, some example tasks that may be learned through reinforcement learning techniques disclosed herein are described in more detail. Some examples of tasks include random-target reaching, door pushing and/or pulling, and pick and place. For example, in a reaching task a robot arm may try to reach a random target in space from a fixed initial configuration. A random target is generated per episode by sampling points uniformly from a cube of size 0.2 m centered around a point. The random target may be provided as the success signal. Given the end-effector position e and the target position y, the reward function may be: $r(x;u) = c_1 d(y; e(x)) c_2 u^T u$.

Also, for example, in a door pushing and pulling task, a robot arm may try to open a door by pushing or pulling a handle of the door. The handle can be turned downward for up to 90 degrees, while the door can be opened up to 90 degrees in both directions. The door has a spring such that it closes gradually when no force is applied. The door has a latch such that it could only open the door only when the handle is turned past approximately 60 degrees. An IMU sensor attached to the door can be used for door angle measurements, and quaternion readings from the IMU sensor can be used to compute the loss. For example, the reward function can be composed of two parts: the closeness of the end-effector to the handle, and the measure of how much the door is opened in the right direction. The first part of the reward function depends on the distance between end-effector position e and the handle position h in its neutral state. The second part of the reward function depends on the distance between the quaternion of the handle q and its value when the handle is turned and door is opened $q_O$. State features can include the joint angles of the robot arm and their time derivatives, the end-effector position, the resting door handle position, the door frame position, the door angle, and the handle angle.

Figure 6:
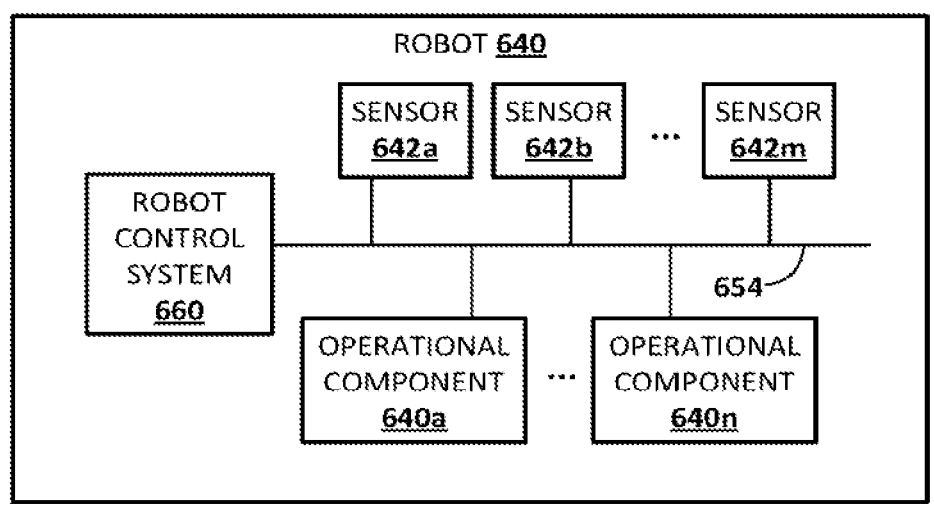
FIG. 6 schematically depicts an example architecture of a robot.

FIG. 6 schematically depicts an example architecture of a robot 640. The robot 640 includes a robot control system 660, one or more operational components 640a-640n, and one or more sensors 642a-642m. The sensors 642a-642m may include, for example, vision sensors, light sensors, pressure sensors, pressure wave sensors (e.g., microphones), proximity sensors, accelerometers, gyroscopes, thermometers, barometers, and so forth. While sensors 642a-m are depicted as being integral with robot 620, this is not meant to be limiting. In some implementations, sensors 642a-m may be located external to robot 620, e.g., as standalone units.

Operational components 640a-640n may include, for example, one or more end effectors and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640a-n, with each of the real time bursts comprising a set of one or more control commands that dictate, inter alia, the parameters of motion (if any) for each of one or more of the operational components 640a-n. In some implementations, the robot control system 660 may perform one or more aspects of methods 300, 400, and/or 500 described herein.

As described herein, in some implementations all or aspects of the control commands generated by control system 660 in moving one or more components of a robot may be based on output generated over a policy network based on a current robot state and/or other observations. Although control system 550 is illustrated in FIG. 6 as an integral part of the robot 620, in some implementations, all or aspects of the control system 550 may be implemented in a component that is separate from, but in communication with, robot 620. For example, all or aspects of control system 660 may be implemented on one or more computing devices that are in wired and/or wireless communication with the robot 620, such as computing device 710.

Figure 7:
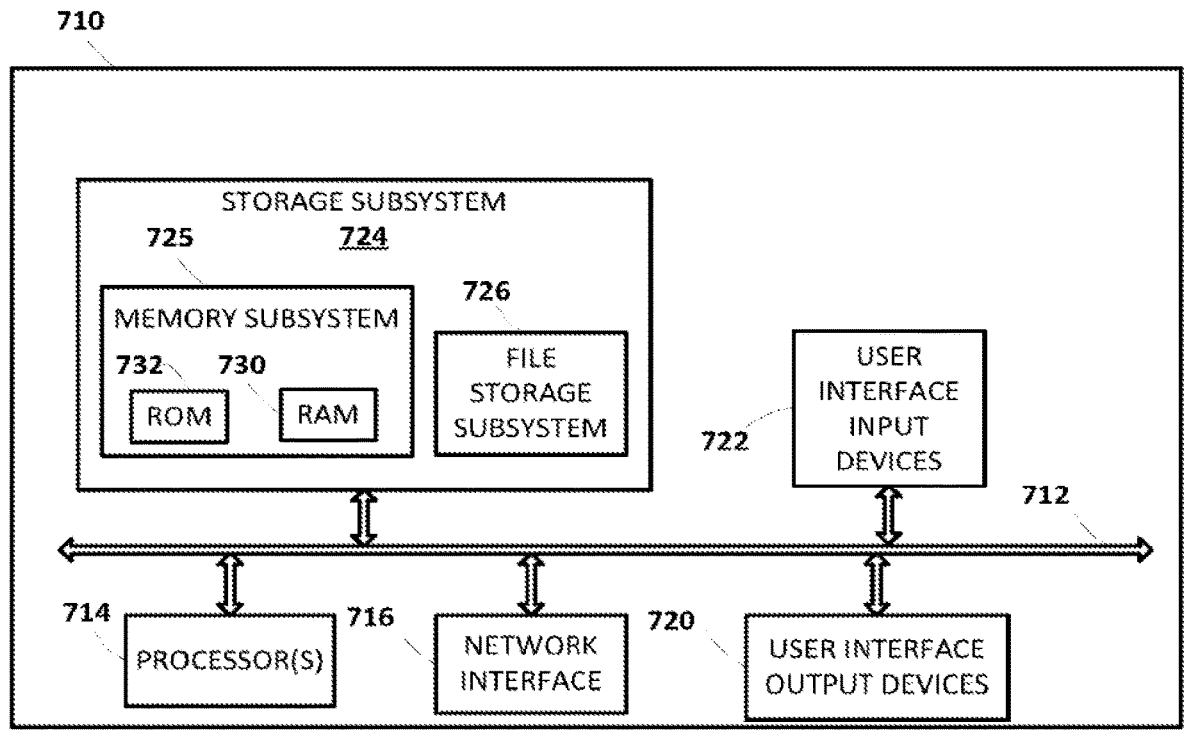
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 3, 4, and/or 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system, comprising:
memory storing instructions;
one or more processors operable to execute the instructions, stored in the memory, to:
during performance of a plurality of episodes by each of a plurality of robots, each of the episodes including performing a task based on a policy neural network representing a reinforcement learning policy for the task:
store, in a buffer, instances of robot experience data generated during the episodes by the plurality of robots, each of the instances of the robot experience data being generated during a corresponding one of the episodes, and being generated at least in part on corresponding output generated using the policy neural network with corresponding policy parameters for the policy neural network for the corresponding episode;
iteratively generate updated policy parameters of the policy neural network, wherein in each of the iterations of iteratively generating the updated policy parameters one or more of the processors are to generate the updated policy parameters using a group of one or more of the instances of the robot experience data in the buffer during the iteration; and
by each of the robots in conjunction with a start of each of a plurality of the episodes performed by the robot, update the policy neural network to be used by the robot in the episode, wherein updating the policy neural network comprises using the updated policy parameters of a most recent iteration of the iteratively generating the updated policy parameters.

2. The system of claim 1, wherein each of the updated policy parameters defines a corresponding value for a corresponding node of a corresponding layer of the policy neural network.

3. The system of claim 1, wherein the instances of the robot experience data for each of the robots are stored in the buffer at corresponding frequencies that are each lower than a second frequency of iteratively generating the updated policy parameters.

4. The system of claim 1, wherein storing, in the buffer, the instances of the robot experience data is performed by one more of the processors in a first thread and wherein the iteratively generating is performed by one or more of the processors in a second thread that is separate from the first thread.

5. The system of claim 4, wherein the first thread is performed by a first group of one or more of the processors and the second thread is performed by a second group of one or more of the processors, the second group being non-overlapping with the first group.

6. The system of claim 1, wherein in each of the iterations of iteratively generating the updated policy parameters one or more of the processors are to generate the updated policy parameters based on minimizing a loss function in view of a group of one or more of the instances of the robot experience data in the buffer during the generating iteration.

7. The system of claim 1, wherein in each of the iterations of iteratively generating the updated policy parameters one or more of the processors are to perform off-policy learning in view of a group of one or more of the instances of the robot experience data in the buffer during the generating iteration.

8. The system of claim 7, wherein the off-policy learning is Q-learning.

9. The system of claim 8, wherein the Q-learning utilizes a normalized advantage function (NAF) algorithm or a deep deterministic policy gradient (DDPG) algorithm.

10. The system of claim 1,
wherein each of the instances of the robot experience data indicates a corresponding:
beginning robot state, subsequent robot state transitioned to from the beginning robot state, action executed to transition from the beginning robot state to the subsequent robot state, and reward for the action;
wherein the action executed to transition from the beginning robot state to the subsequent robot state is generated based on processing of the beginning robot state using the policy neural network with the updated policy parameters for the corresponding episode, and wherein the reward for the action is generated based on a reward function for the reinforcement learning policy.

11. The system of claim 1, wherein one or more processors are further operable to execute the instructions, stored in the memory, to:
based on one or more criteria, cease the performance of the plurality of episodes and cease the iteratively generating; and
provide, for use by one or more additional robots, the policy neural network with a most recently generated version of the updated policy parameters.

12. A robot comprising:
one or more actuators;
memory storing instructions;
one or more processors operable to execute the instructions, stored in the memory, to:
  perform a given episode of performing a task based on a policy network having a first group of policy parameters;
  provide first instances of robot experience data generated based on the policy network during the given episode;
  prior to performance, by the robot, of a subsequent episode of performing the task based on the policy network:
    replace one or more of the policy parameters of the first group with updated policy parameters, wherein the updated policy parameters are generated based on training of the policy network based on additional instances of robot experience data, generated by additional robots during additional robot episodes of performing the task by the additional robots, wherein the additional robot episodes of the performing the task by the additional robots is based on the policy network;
    wherein the subsequent episode immediately follows the first episode, and wherein performing the task based on the policy network in the subsequent episode comprises using the updated policy parameters in lieu of the replaced policy parameters.

13. The robot of claim 12, wherein the updated policy parameters are not utilized by the additional robots in performance of any episodes by the additional robots.

14. The robot of claim 12, wherein the policy network comprises a neural network model.

15. The robot of claim 14, wherein each of the updated policy parameters defines a corresponding value for a corresponding node of a corresponding layer of the neural network model.

16. The robot of claim 12, wherein one or more processors are further operable to execute the instructions, stored in the memory, to, during performance of the given episode of performing the task:
  determine a violation, of one or more criteria for the robot, in a given iteration of output from the policy network;
  modify the output of the given iteration so that the one or more criteria are no longer violated; and
  generate a given instance of the instances of experience data based on the modified output.

17. The robot of claim 12, wherein in performing the given episode one or more of the processors are to:
  apply a current state representation as input to the policy network, the current state representation indicating a current state of at least the robot;
  generate output by processing the input using the policy network; and
  provide control commands to one or more actuators of the robot based on the output.

18. A system, comprising:
memory storing instructions;
one or more processors operable to execute the instructions, stored in the memory, to:
  receive, in one iteration of a plurality of experience data iterations of receiving experience data from a given agent of a plurality of agents, a given instance of agent experience data generated by the given agent, wherein the given instance of the agent experience data is generated during a given episode of performing a task based on a given version of policy parameters of a policy network utilized by the given agent in generating the given instance;
  receive additional instances of agent experience data from additional agents of the plurality of agents, the additional instances generated during episodes, by the additional agents, of performing the task based on the policy network, wherein the plurality of experience data iterations occur at a first frequency;
  while the given agent and the additional agents continue the episodes of performing the task, generate a new version of the policy parameters of the policy network based on training of the policy network based at least in part on the given instance and the additional instances, wherein the training of the policy network comprises a plurality of training iterations occurring at a second frequency that is greater than the first frequency, the plurality of training iterations including:
    a first training iteration of training of the policy network based at least in part on the given instance and the additional instances; and
    one or more additional training iterations of training of the policy network based on yet further instances of experience data from the plurality of the agents; and
  provide the new version of the policy parameters to the given agent for performing of an immediately subsequent episode of performing the task by the given agent based on the new version of the policy parameters.

19. The system of claim 18, wherein one or more processors are further operable to execute the instructions, stored in the memory, to:
  perform, by the given agent, the immediately subsequent episode of performing the task by the given agent based on the new version of the policy parameters.

20. A system, comprising:
memory storing instructions;
one or more processors operable to execute the instructions, stored in the memory, to:
  iteratively receive instances of experience data generated by a plurality of agents operating asynchronously and simultaneously, wherein each of the instances of experience data is generated by a corresponding agent of the plurality of agents during a corresponding episode of performing a task based on a policy neural network;
  iteratively train a policy neural network based on the received experience data from the plurality of agents to generate one or more updated parameters of the policy neural network at each of the training iterations; and
  iteratively and asynchronously provide instances of the updated parameters to the agents for updating the policy neural networks of the agents prior to the subsequent episodes of performing the task on which further instances of experience data are based.

21. The system of claim 20, wherein one or more processors are further operable to execute the instructions, stored in the memory, to:
  perform, at the agents, said episodes of performing the task on which the instances of experience data are based.

* * * * *